(12) United States Patent
Foust et al.

(10) Patent No.: US 11,314,668 B2
(45) Date of Patent: Apr. 26, 2022

(54) METHOD, APPARATUS AND SYSTEM FOR DEVICE TRANSPARENT GROUPING OF DEVICES ON A BUS

(71) Applicant: Intel Corporation, Santa Clara, CA (US)

(72) Inventors: Kenneth P. Foust, Beaverton, OR (US); Amit Kumar Srivastava, Folsom, CA (US); George Vergis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 919 days.

(21) Appl. No.: 15/898,909

(22) Filed: Feb. 19, 2018

(65) Prior Publication Data

US 2019/0042495 A1 Feb. 7, 2019

(51) Int. Cl.
*G06F 13/40* (2006.01)
*G06F 13/16* (2006.01)
*G06F 12/06* (2006.01)
*G06F 13/42* (2006.01)

(52) U.S. Cl.
CPC ........ *G06F 13/1673* (2013.01); *G06F 12/063* (2013.01); *G06F 12/0623* (2013.01); *G06F 13/4027* (2013.01); *G06F 13/4282* (2013.01)

(58) Field of Classification Search
CPC ............. G06F 13/1673; G06F 13/4027; G06F 12/0623; G06F 12/063; G06F 13/4282; G06F 13/4022; G06F 13/4291
See application file for complete search history.

(56) References Cited

U.S. PATENT DOCUMENTS

| | | |
|---|---|---|
| 2010/0169523 A1 | 7/2010 | Dunstan et al. |
| 2013/0335151 A1 | 12/2013 | Schrom et al. |
| 2014/0016679 A1 | 1/2014 | Kesling et al. |
| 2014/0229644 A1 | 8/2014 | Thanigasalam et al. |
| 2016/0299855 A1* | 10/2016 | Pitigoi-Aron ......... G06F 13/102 |
| 2017/0034284 A1 | 2/2017 | Smith et al. |
| 2018/0052802 A1* | 2/2018 | Pitigoi-Aron ....... G06F 13/4295 |

OTHER PUBLICATIONS

U.S. Appl. No. 15/237,928, filed Aug. 16, 2016, entitled "Method, Apparatus and System for Role Transfer Functionality for a Bus Master," by Amit Kumar Srivastava, et al.

(Continued)

*Primary Examiner* — Ernest Unelus
(74) *Attorney, Agent, or Firm* — Trop, Pruner & Hu, P.C.

(57) ABSTRACT

In one embodiment, a host controller includes: a first input/output (I/O) buffer to couple to a first communication line of an interconnect; a second I/O buffer to couple to a second communication line of the interconnect; and a device group selection circuit to dynamically cause the first communication line to communicate a clock signal to a first device group including one or more first devices to couple to the interconnect and dynamically cause the second communication line to communicate a data signal to the first device group when a communication is to be addressed to at least one of the one or more first devices of the first device group, such that the communication is transparent to at least another device group to couple to the interconnect. Other embodiments are described and claimed.

19 Claims, 8 Drawing Sheets

(56) References Cited

OTHER PUBLICATIONS

U.S. Appl. No. 15/366,001, filed Dec. 1, 2016, entitled "Method, Apparatus and System for Dynamic Clock Frequency Control on a Bus," by Duane G. Quiet, et al.
U.S. Appl. No. 15/198,027, filed Jun. 30, 2016, entitled "Method, Apparatus and System for Dynamic Optimization of Signal Integrity on a Bus," by Duane G. Quiet.
Mipi Alliance, "Specification Brief, Audio & Control: SLIMbus®, SoundWireSM," Oct. 7, 2014, 1 page.
U.S. Appl. No. 15/627,735, filed Jun. 20, 2017, entitled "System, Apparatus and Method for Extended Communication Modes for a Multi-Drop Interconnect," by Amit Kumar Srivastava.
U.S. Appl. No. 15/635,299, filed Jun. 28, 2017, entitled "Method, Apparatus and System for Dynamic Control of Clock Signaling on a Bus," by Kenneth P. Foust, et al.
U.S. Appl. No. 15/627,749, filed Jun. 20, 2017, entitled "System, Apparatus and Method for Tunneling and/or Multiplexing Via a Multi-Drop Interconnect," by Amit Kumar Srivastava.
U.S. Appl. No. 15/706,913, filed Sep. 18, 2017, entitled "System, Apparatus and Method for Secure Communication on a Bus," by Amit Kumar Srivastava, et al.
U.S. Appl. No. 15/706,902, filed Sep. 18, 2017, entitled "Method, Apparatus and System for Power Supply Policy Exchange on a Bus," by Amit Kumar Srivastava, et al.

* cited by examiner

METHOD, APPARATUS AND SYSTEM FOR DEVICE TRANSPARENT GROUPING OF DEVICES ON A BUS

TECHNICAL FIELD

Embodiments relate to communication of information on bus structures.

BACKGROUND

Many different types of known buses and other interfaces are used to connect different components using a wide variety of interconnection topologies. For example, on-chip buses are used to couple different on-chip components of a given integrated circuit (IC) such as a processor, system on a chip or so forth. External buses can be used to couple different components of a given computing system either by way of interconnect traces on a circuit board such as a motherboard, wires and so forth.

A recent multi-drop interface technology is an Improved Inter Integrated Circuit (I3C) Specification-based bus, available from the Mobile Industry Processor Interface (MIPI) Alliance™ (www.mipi.org). This interface is expected to be used to connect devices, such as internal or external sensors or so forth, to a host processor, applications processor or standalone device via a host controller or input/output controller. This multi-drop bus provides for single-ended bi-directional data communication with a single-ended clock signal.

DETAILED DESCRIPTION

In various embodiments, a device transparent mechanism is provided to enable a single host controller to communicate with a number of individual devices that exceeds a number of devices addressable in a native address space. To this end, embodiments may dynamically slice the present devices into multiple (e.g., 2) groups. This address slicing may be managed via dynamically controlled pin multiplexing, input/output (I/O) routing and appropriate selection behavior. Embodiments may thus expand a number of devices that couple to a multi-drop bus beyond an available address space, while not redesigning a given bus specification or adding another bus instance/host controller.

Although embodiments are applicable to many different use cases, one embodiment may be used for communication via a MIPI I3C bus, which is designed for 7-bit device addressing. Thus according to a native addressing mode of this bus, a maximum of 128 devices can be uniquely addressed. In some systems however, more than 128 unique devices may couple to this multi-drop bus. For example, for a memory use case such as for double data rate (DDR) memory devices (e.g., DDR4/5 Serial Presence Detect (SPD) devices), there can be more than 128 individual memory devices that couple to a single multi-drop bus. As an example, 16 dual inline memory modules (DIMMs) each having up to 16 SPD devices could not couple to a single multi-drop bus that uses a 7-bit addressing scheme, without an embodiment. Stated another way, embodiments enable individual addressing of $2^N$ devices using less than N (e.g., N−1) address bits, without changing the I3C specification or redesigning devices to accommodate an expanded address space. As such, the complexity and inefficiency of expanding a native (e.g., 7-bit) address space can be avoided.

Figure 1:
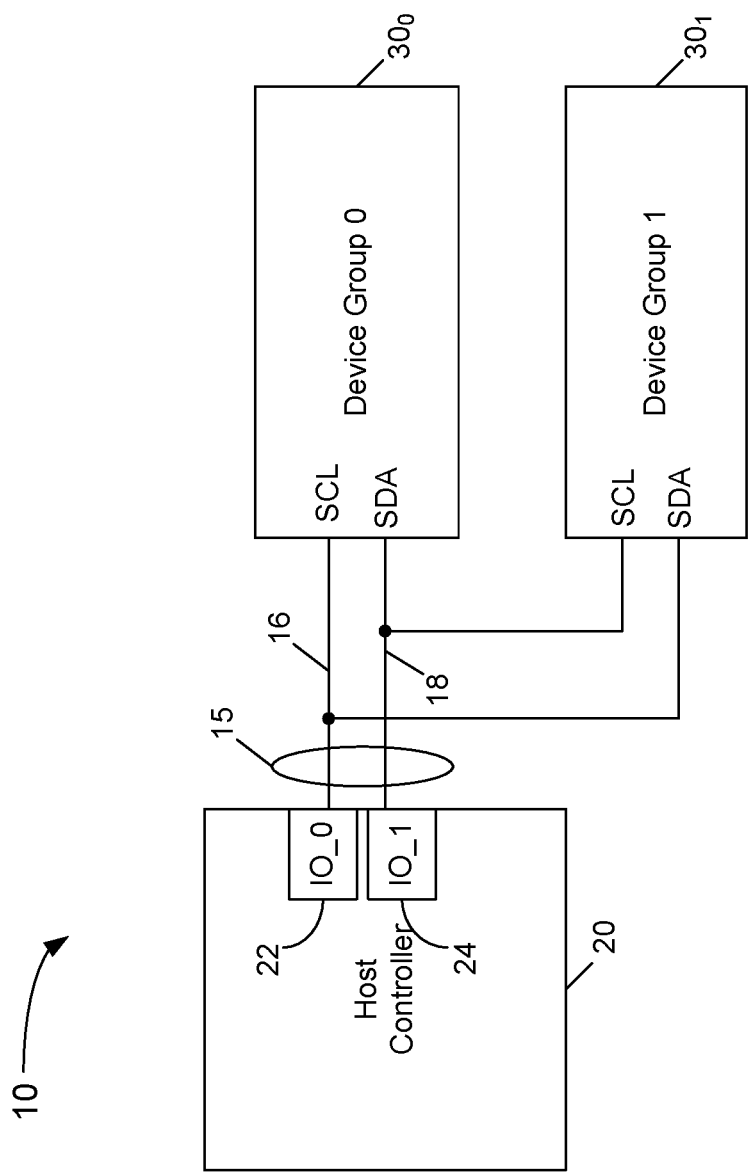
FIG. 1 is a block diagram of a system in accordance with an embodiment of the present invention.

Referring now to FIG. 1, shown is a block diagram of a system in accordance with an embodiment of the present invention. More specifically, system 10 shown in FIG. 1 represents at least a portion of any one of a variety of different types of computing devices. In different embodiments, such computing devices can range from relatively small low power devices such as a smartphone, tablet computer, wearable device or so forth, to larger devices such as laptop or desktop computers, server computers, automotive infotainment devices and so forth. In any case, system 10 includes a bus 15. In embodiments herein, bus 15 may be implemented as an I3C bus in accordance with the I3C Specification. However, understand the scope of the present invention is not limited in this regard and in other embodiments, bus 15 may be implemented as any type of multi-drop interconnect.

As illustrated, a primary or main master device 20 couples to bus 15. In various embodiments, master device 20 may be implemented as a host controller that includes hardware circuitry to act as a bus master for bus 15. Master device 20 may include a controller (not shown in the high level view of FIG. 1) to control data (SDA) and clock (SCL) lines, as well as use (e.g.,) internal current sources or passive pullups to hold bus 15 when all coupled devices are powered off. In some cases, master device 20 may be a relatively simple host controller for a low complexity bus or other multi-drop bus, such as in accordance with an I²C or I3C Specification. Other multi-drop interfaces such as Serial Peripheral Interface and/or Microwire also may be present in a particular embodiment.

In different implementations, master device 20 may be an interface circuit of a multicore processor or other system on chip (SoC), application processor or so forth. In other cases, master device 20 may be a standalone host controller (such as a given integrated circuit (IC)) or main master device for bus 15. And of course other implementations are possible. In other cases, master device 20 may be implemented as hardware, software, and/or firmware or combinations thereof, such as a dedicated hardware circuit, e.g., a programmable logic, to perform bus master activities for bus 15.

Note that bus 15 is implemented as a two-wire bus in which a single serial line forms a first interconnect and another single serial line forms a second interconnect. As such, data communications can occur, e.g., in bi-directional manner and clock communication can occur in a single direction. As illustrated, master device 20 couples via bus 15 to a plurality of device groups $30_0$, $30_1$. In embodiments, each of device groups 30 may include one or more devices that may be in communication with master device 20. In particular embodiments herein, device groups 30 may be formed of multiple memory devices such as individual memory modules of a system memory such as may be implemented by DIMMs. That is, in a particular embodiment, each device within device groups 30 may be implemented as a given memory chip implemented on a DIMM, namely a SPD memory device.

By providing multiple device groups, a number of individual devices that exceeds a device addressing space of bus 15 can couple to bus 15. As an example, each device group 30 may include up to 128 individual devices, such that with device groups $30_0$, $30_1$, up to 256 individual devices may be present. With embodiments herein, a 7-bit device addressing scheme for bus 15 may be used to suitably individually address a given device within these multiple device groups. Stated another way, a given device within both device groups 30 may be addressed with the same device address, yet only a single device may be selected for communication at a given time using the device transparent addressing scheme described herein. This is so, since with the device transparent grouping of devices as described herein for an I3C bus, if clock (SCL) and data (SDA) paths are swapped between the device groups, devices that couple to these lines are effectively not present, and therefore not addressable on the bus. In other words, communications with one or more devices of a first device group proceed transparently to devices of one or more other device groups.

As such, with the device transparent addressing scheme described herein, only devices within one of device groups 30 may at a given time be suitably adapted to receive a communication from master device 20. That is, as shown in FIG. 1, the two different device groups 30 are coupled in opposition, such that a first line 16 of bus 15 couples as a clock line to devices in device group $30_0$ (having buffers or other receivers to receive and handle clock signaling) while at the same time coupling as a data line to devices within device group $30_1$ (having buffers or other receivers to receive and handle data signaling). And, vice-versa a second line 18 of bus 15 couples as a data line to devices in device group $30_0$ (having buffers or other transceivers to receive and handle data signaling) while at the same time coupling as a clock line to devices within device group $30_1$ (having buffers or other receivers to receive and handle clock signaling).

To this end, selective control of input/output (I/O) buffers 22, 24 within master device 20 may occur such that when a device within device group $30_0$ is to be addressed, I/O buffer 22 is configured to drive a clock signal, while in turn I/O buffer 24 is configured for data communication. With this configuration, a clock signal is communicated via line 16 and data may be communicated via line 18. In this way, valid I3C communication may occur with one or more devices within device group $30_0$. In contrast, valid I3C communication does not occur with any device within device group $30_1$, as this communication is transparent to these devices.

Similarly, selective control of I/O buffers 22, 24 within master device 20 may occur such that when a device within device group $30_1$ is to be addressed, I/O buffer 22 is configured for data communication and I/O buffer 24 is configured to drive the clock signal. With this configuration, a clock signal is communicated via line 18 and data may be communicated via line 16. In this way, valid I3C communication may occur with one or more devices within device group $30_1$.

With the arrangement shown in FIG. 1, where I/O buffer 22 is assigned to communicate a clock signal and I/O buffer 24 is assigned to communicate data, a direct communication path is effected between master device 20 and the devices in device group $30_0$, while the devices in device group $30_1$ do not see any of the key conditions/events of an I3C transmission (e.g., Start, SAD+W, ACK, Stop) and thus are effectively not present. In this instance, the entire available 7-bit address space can be used for all of the components in device group $30_0$.

While FIG. 1 is described with an implementation in which device groups 30 are formed of individual memory devices, many variations and alternatives are possible. That is, in many situations, device groups 30 may be formed of disparate computing devices, sensor devices, communication devices, peripheral devices or so forth. For example, in other embodiments, device groups 30 may be formed of collections of disparate slave devices that may be implemented as sensors such as micro-electrical mechanical systems (MEMS), imaging sensors, peer-to-peer devices, debug devices or so forth. In yet other cases, other sensor types, such as accelerometers, camera devices or so forth may be present in one or more of device groups 30. Still further, while FIG. 1 shows an embodiment in which master device 20 is implemented as a host controller, it is possible in other cases for one or more devices of device groups 30 to be implemented as secondary master devices, which may be controlled to act as a bus master for bus 15 while master device 20 is in a low power state. Further, while FIG. 1 shows an arrangement with two device groups, understand the scope of the present invention is not limited in this regard. That is, in other embodiments more than two device groups are possible so that greater amounts of devices can be addressed. As another example, to accommodate up to 512 individual devices to be addressed with a 7-bit addressing scheme, additional selection circuitry (e.g., additional multiplexers) or selection circuitry with additional state can be present so that a given device within a device group of more than two device groups can be selected for communication. Understand while shown at this high level in the embodiment of FIG. 1, many variations and alternatives are possible.

Figure 2:
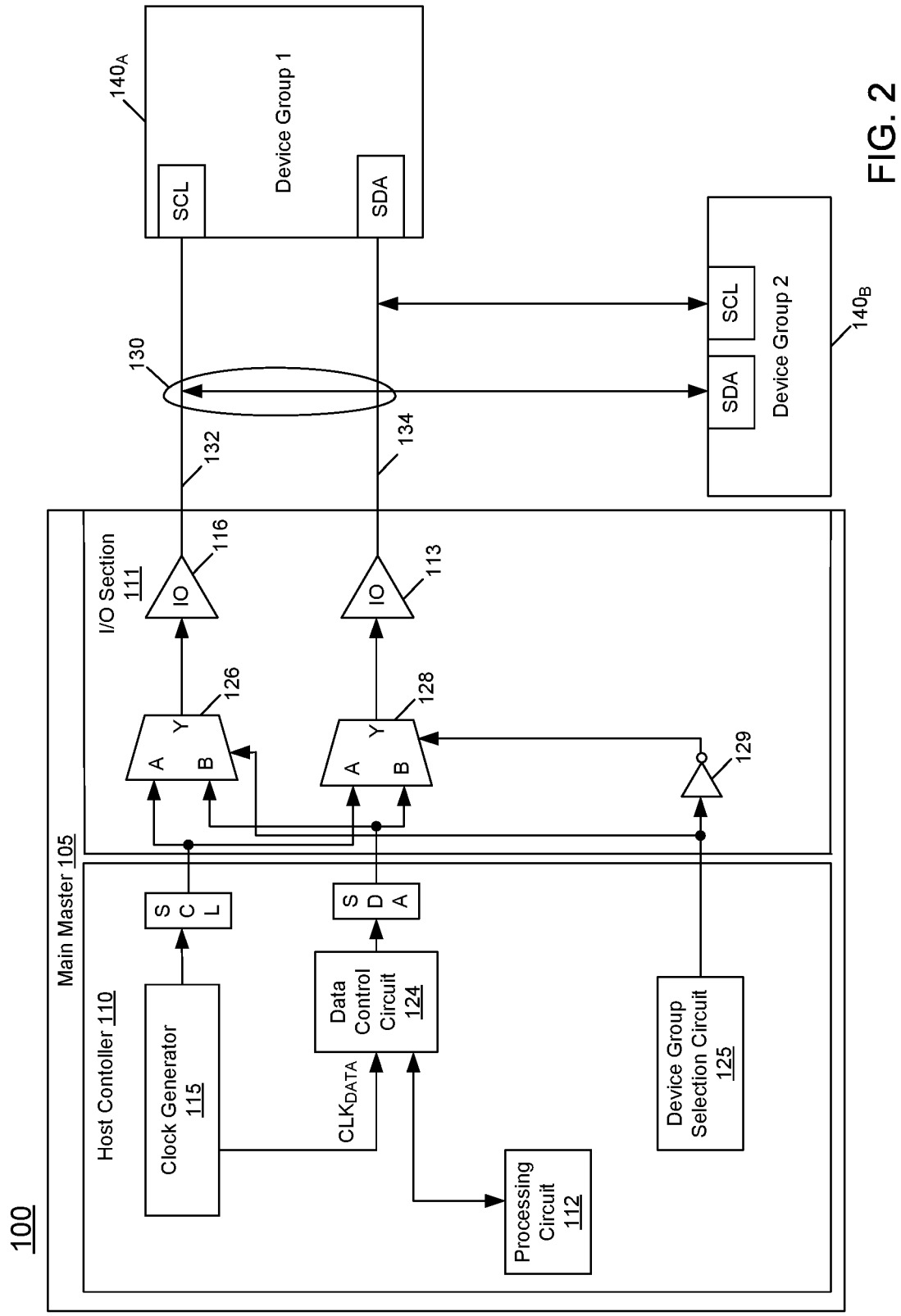
FIG. 2 is a block diagram of another system in accordance with an embodiment of the present invention.

Referring now to FIG. 2, shown is a block diagram of another system in accordance with an embodiment of the present invention. As shown in FIG. 2, a portion of a system 100 includes a main master 105 including a host controller 110 coupled to a plurality of device groups $140_A$-$140_B$ via a multi-drop bus 130. As further illustrated, main master 105 includes an input/output (I/O) section 111. Devices within device groups 140 (also referred to herein as "slaves") may have different operational characteristics and also may have different capabilities of being added/removed from bus 130. As will be described herein, host controller 110 may be configured as a bus master, in at least certain operational phases. Bus 130 is implemented as a two-wire bus in which a single serial line forms a data interconnect and another single serial line forms a clock interconnect. As such, data communications can occur in a bi-directional manner and clock communications can occur in a unidirectional manner.

As illustrated in FIG. 2, host controller 110 has a processing circuit 112. Understand that many different types of host controllers can be provided. As examples, host controller 110 may be an interface circuit of a multicore processor or other system on chip (SoC), application processor or so forth. In other cases, host controller 110 may be a standalone host controller for bus 130. And of course other implementations are possible. In different implementations, processing circuit 112 may represent one or more cores or other hardware processing logic of a particular device or it may simply be part of an interface circuit to act as transmitter and receiver for host controller 110. In turn, processing circuit 112 couples via a data control circuit 124 to output and receive data (represented as SDA).

Host controller 110 further includes a clock generator 115 to generate a variety of different clock signals both for internal use and for communication on bus 130, including a clock signal to be output (represented as SCL). In various embodiments, clock generator 115 may be configured to generate a bus clock signal at 12.5 MHz.

To provide the dynamic control of clock and data signaling on different lines of a multi-drop bus as described herein, host controller 110 includes a device group selection circuit 125. Device group selection circuit 125 may, based upon identification of a particular device or devices within a given device group, control selection circuitry appropriately to enable communication of clock signaling on one of lines 132, 134 of bus 130 and data signaling on the other of lines 132, 134. In this way, only devices within a given device group may validly communicate during a bus communication with host controller 110. Instead, such signaling may remain transparent to devices within the other device group.

Although different implementations of a selection circuit are possible to enable the dynamic communication of clock and data signaling as described herein, in the embodiment of FIG. 2, main master 105 includes in its I/O section 111 a first selection circuit 126 and a second selection circuit 128. In the embodiment shown, first selection circuit 126, which may be implemented as a multiplexer, is configured to receive a clock signal from clock generator 115 via a first input and receive a data input from data control circuit 124 via a second input. As illustrated, selection circuit 126 is controlled by a select signal output from device group selection circuit 125. As such, when communication is to be with a device within first device group $140_A$, the select signal may be output as a logic high or active signal, such that the output of first selection circuit 126 is the clock signal, provided to an I/O buffer 116, implemented as a driver (and which may also include a receiver), which drives the clock signal via line 132. And as illustrated in FIG. 2, line 132 may couple to clock inputs of the various devices within first device group $140_1$. Instead, line 132 couples to a data input of devices within second device group $140_2$.

And similarly, second selection circuit 128, also implemented as a multiplexer, is configured to receive the clock signal from clock generator 115 via a first input and receive the data input from data control circuit 124 via a second input. As illustrated, selection circuit 128 is controlled by an inverted select signal output from an inverter 129 (which receives the select signal from device group selection circuit 125). As such, when communication is to be with a device within first device group $140_A$, the inverted signal may be output as a logic low signal, such that the output of second selection circuit 128 is the data signal, provided to an I/O buffer 113, implemented as a driver that drives data via line 134 (and a receiver that receives data via line 134).

Instead with opposite control of the first and second selection circuits by device group selection circuit 125, data may be communicated via line 132 and a clock signal is driven on line 134, such that valid communication may occur with one or more devices in second device group $140_B$.

Note that various embodiments may provide different manners (both inside and outside of a host controller) to effect assignment of devices. In the embodiment of FIG. 2, host controller 110 multiplexes the SCL and SDA lines into both I/O buffer 113 and I/O buffer 116. Based on its contextual understanding (e.g., software desire to communicate with a device in group 0), host controller 110 is configured to appropriately set multiplexer select lines accordingly. In the arrangement of FIG. 2, the selection truth table of Table 1 may be used to dynamically control selection to enable communication with a device in a given one of the device groups.

TABLE 1

| S | IO_0 | IO_1 | Device Group |
|---|------|------|--------------|
| 0 | SCL  | SDA  | 0            |
| 1 | SDA  | SCL  | 1            |

Once the multiplexer select line (S) is appropriately set, host controller 110 is then allowed to communicate with any of the slave devices in that device group via the assigned 7-bit addresses for each slave device, without bus conflict, since the devices in the other group will effectively have their SCL and SDA lines swapped.

Figure 3:
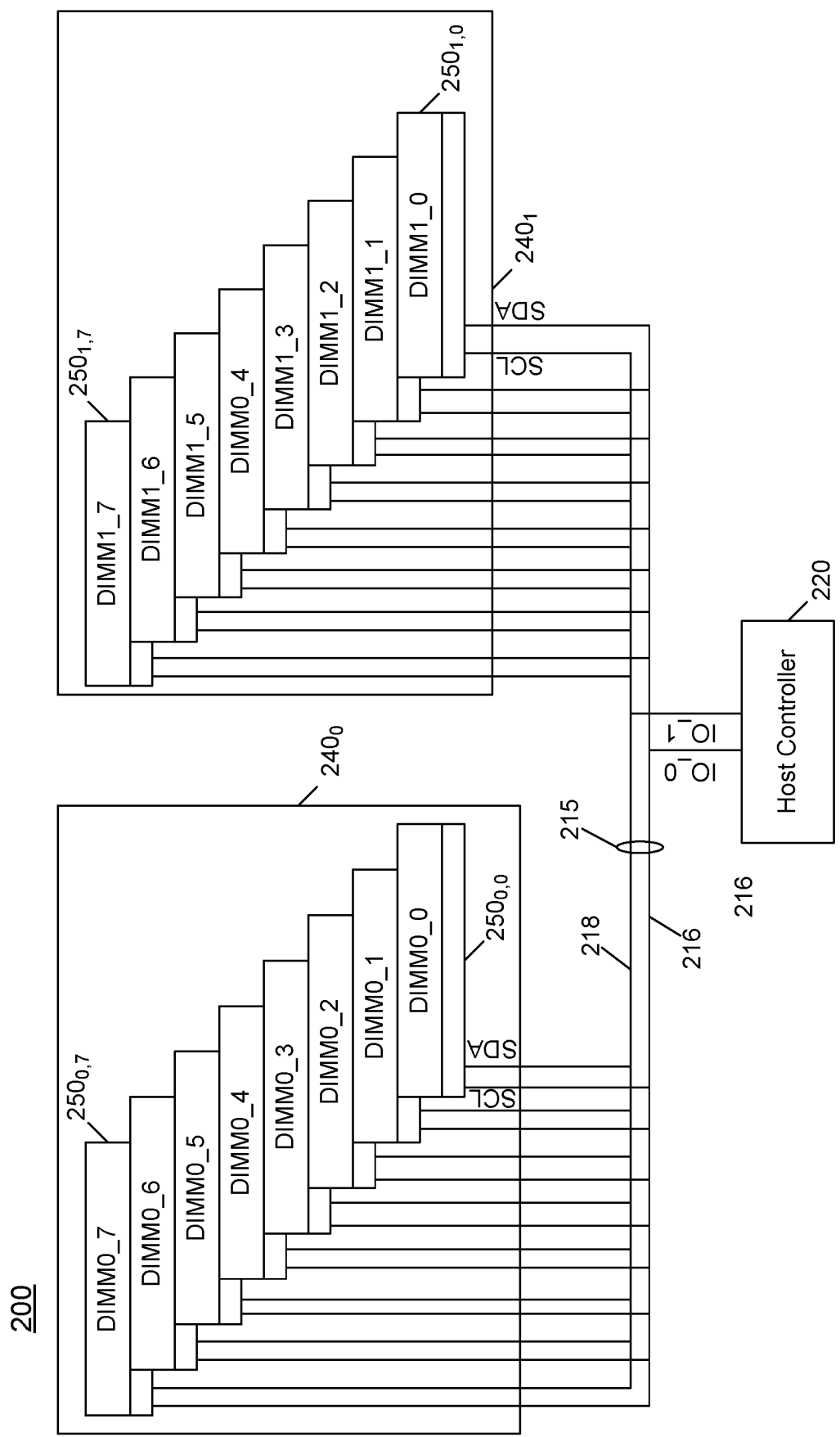
FIG. 3 is a block diagram of a system in accordance with another embodiment of the present invention.

Note that with a multiplicative nature of usage, such as those related to sideband interfacing to DIMM components, an entire 7-bit address space is more than fully occupied. Referring now to FIG. 3, shown is a block diagram of a system in accordance with another embodiment of the present invention. As shown in FIG. 3, system 200 may be part of a computing system showing interconnection between a host controller 220 as described herein with multiple device groups, namely device groups $240_0$, $240_1$. As illustrated, each device group 240 may be formed of multiple individual memory modules. Specifically, first device group $240_0$ is formed of a plurality of DIMMs $250_{0,0}$-$250_{0,7}$. In an embodiment, each DIMM 250 may be implemented as a standalone circuit board including multiple individual memory devices, e.g., each an SPD memory device that may be individually addressed. Assume for purposes of discussion that each DIMM 250 includes 16 individual memory devices. As such, the collection of 8 DIMMs 250 may include up to 128 individually addressable memory devices. With an I3C device address implementation for bus 215, a full 7-bit address space may thus be consumed in individually addressing these 128 memory devices.

To enable complete individual addressing of up to 256 individual memory devices of both device groups 240, embodiments may dynamically control communication of clock and data signaling on appropriate lines 216, 218 to enable only devices within a given device group 240 to receive valid signaling. That is, as illustrated, line 216 of bus 215 couples to clock pads of devices $250_{0,0}$-$250_{0,7}$, and in turn couples to data pads of devices $250_{1,0}$-$250_{1,7}$. In turn, line 218 of bus 215 couples to data pads of devices $250_{0,0}$-$250_{0,7}$, and to clock pads of devices $250_{1,0}$-$250_{1,7}$.

By dynamically controlling communication of data and clock signaling on different lines of bus 216 depending upon an intended target of a communication, host controller 220 may enable device transparent addressing, such that a given device within each of device groups 240 may be addressed with the same exact 7-bit address, yet correctly receive communications directed only to it. Understand while shown at this high level in the embodiment of FIG. 3 with an implementation for memory communication with device transparent grouping, the scope of the present invention is not limited in this regard, and in other cases device groups may be formed of one or more other types of devices such as sensors, communication devices, and so forth.

In embodiments, to ensure proper I3C bus operation, certain modes may be avoided. For example, in an embodiment I3C high data rate (HDR) modes (DDR, TSL/TSP) may be avoided in order to ensure that unwanted I3C conditions (e.g., START, Stop, Repeated START) do not asynchronously occur over the SCL and SDA lines of the device group that is not being addressed.

Similarly, where an I3C in-band interrupt (IBI) capability is used, a host controller may be configured to return both lines to a bus idle condition using an open drain architecture (High-Z and pulled high via a resistor). With this arrangement, a device from either group may be configured to transition their perceived SDA line low, indicating an I3C START request. Upon seeing the START request, the host controller configures I/O buffers as appropriate for the group that originated the IBI to allow the request to be appropriately processed.

Figure 4:
FIG. 4 is a timing diagram of an exit pattern in accordance with an embodiment of the present invention.

Embodiments may also be used in a situation in which an in-band hardware reset capability of an I3C bus is used. To this end, a host controller may be configured to ensure that both device groups are properly reset and that they are not exposed to unintended, damaging I3C transmissions. In this case, the first 7 bits of an I²C general call (0x00) could be perceived as transmitted on the bus of the non-addressed devices, but since this is an unused address by I3C, and a STOP condition is transmitted before the 7+RnW bits are transmitted, it will not result in a damaging bus collision. As such, to properly reset both groups correctly, a RESET pattern may be transmitted to each device group separately. This reset pattern 400 is shown in FIG. 4, in which an HDR exit pattern is communicated via an SDA line, and multiple clock pulses are communicated on a SCL line. In embodiments, RESET pattern 460 is sent in its entirety to one group, and then the other group, to reset both groups.

Figure 5:
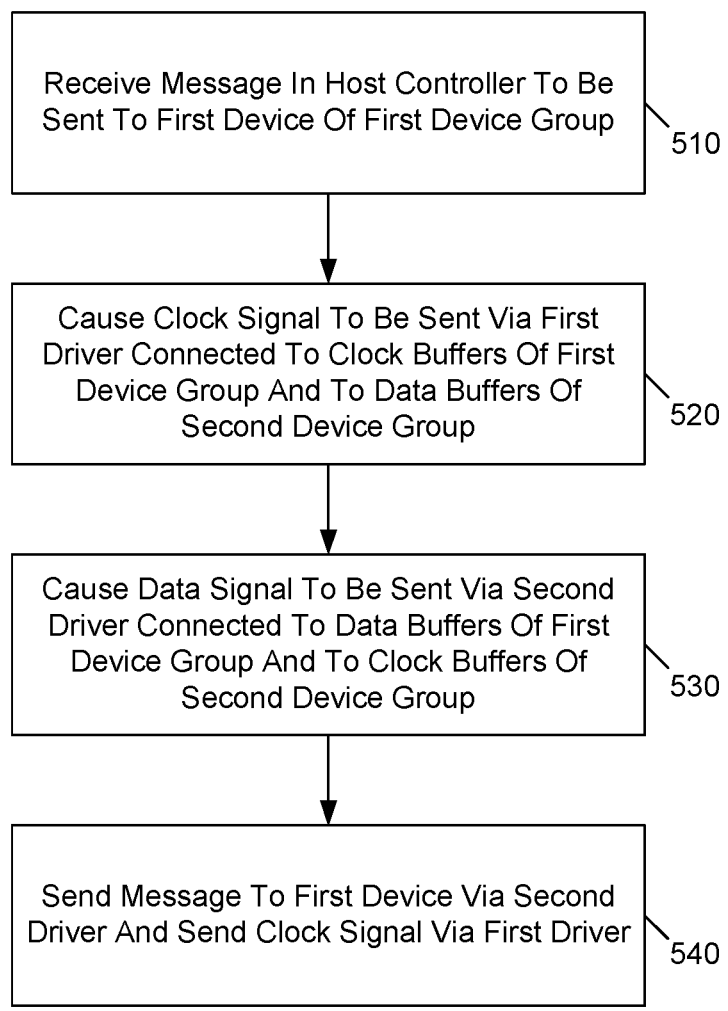
FIG. 5 is a flow diagram of a method in accordance with an embodiment of the present invention.

Referring now to FIG. 5, shown is a flow diagram of a method in accordance with an embodiment of the present invention. Method 500 of FIG. 5 may be performed by circuitry of a host controller, and more specifically by hardware circuitry, firmware, software and/or combinations thereof. In a particular embodiment, device selection grouping circuitry of a host controller may perform at least part of method 500.

As illustrated, method 500 begins by receiving a message in a host controller (block 510). More specifically, this message may be received, e.g., from processing circuitry of a SoC or other integrated circuit including the host controller and may include an indication of a destination for this message. For example, software may issue a message to be sent to a particular memory device adapted on a particular one of multiple DIMMs. As one example, this message may be a request to receive sideband telemetry information from the memory device, such as a temperature of the memory device or so forth. In any event, this message is thus to be directed to a first device that is present in a first device group. As one example, an incoming message may be received in the host controller with an 8-bit address, with e.g., a most significant bit (MSB) identifying a selected group of the two device groups. In other cases, software may send two bytes to the host controller with the first byte identifying the group (to drive the SDA/SCL selection) and the second byte being the address of a particular device that is the communication target.

Still referring to FIG. 5, control next passes to block 520 where a configuration process may be performed to enable desired signaling. To this end, a clock signal is caused to be sent via a first driver that is connected to clock buffers of the first device group and to data buffers of the second device group. In an embodiment, selection circuitry of the host controller can be configured to cause the selection circuitry to output the clock signal to this first driver (which may be an I/O buffer of the host controller that couples to clock buffers (such as receivers) within the devices of the first device group)). However, this same first driver of the host controller is instead coupled to data receivers of devices of the second device group, preventing these devices from properly receiving a communication via the bus. In an embodiment, the device group selection circuit may issue a selection signal to a multiplexer or other selection circuit to thus cause the clock signal to be provided to this first driver.

Control next passes to block 530, where another configuration process may be performed to enable desired signaling. Here a data signal is caused to be sent via a second driver that is connected to data buffers of the first device group and to clock buffers of the second device group. In an embodiment, selection circuitry of the host controller can be configured to cause selection circuitry to output the data signal to this second driver (which may be an I/O buffer of the host controller that couples to data buffers (such as receivers) within the devices of the first device group). However, this same second driver of the host controller is instead coupled to clock receivers of devices of the second device group, preventing these devices from properly receiving a communication via the bus. In an embodiment, the device group selection circuit may issue a selection signal to a multiplexer or other selection circuit to thus cause the data signal to be provided to this second driver.

Finally, with the appropriately configured drivers of the host controller, at block 540 the message may be sent to the first device. More specifically, message content may be communicated via the second driver while at the same time the clock signal may be communicated via the first driver. With this communication, the first device may correctly receive the message and determine it is the intended recipient of the message. At the same time, other devices within this first device group may also correctly receive the message, and will determine, based upon addressing information of the message, that they are not the intended recipient of the message. Instead, the devices of the second device group do not correctly receive the message whatsoever, as this communication is transparent to these devices. Understand while shown at this high level in the embodiment of FIG. 5, many variations and alternatives are possible. That is, by way of control of selection circuitry appropriately, instead when a communication is to be to a device of the second device group, the clock signal may be caused to be sent via the second driver (that in turn couples to clock receivers of devices within the second device group) and the data signal may be sent via the first driver (that couples to data receivers of the devices within the second device group). As such, depending upon a given destination of information, lines of a bus such as an I3C bus as described herein may be dynamically controlled to communicate clock or data information.

Figure 6:
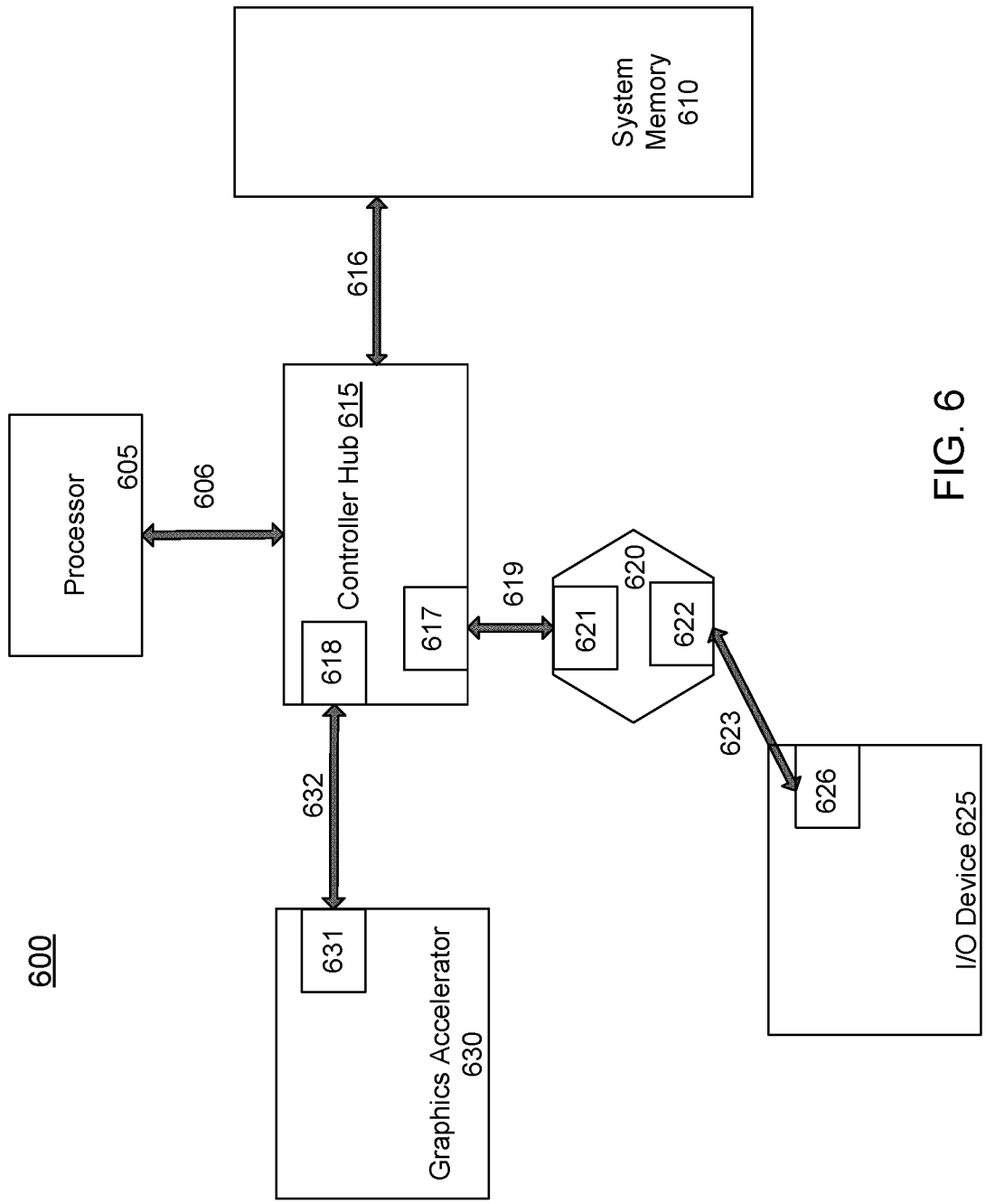
FIG. 6 is a block diagram of a fabric composed of point-to-point links that interconnect a set of components in accordance with an embodiment of the present invention.

Embodiments may be implemented in a wide variety of interconnect structures. Referring to FIG. 6, an embodiment of a fabric composed of point-to-point links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect. In another embodiment, link 606 includes a parallel serial, differential interconnect architecture that is compliant with different interconnect standards, and which may couple with one or more host controllers that enable dynamic clock line control by various link partners as described herein.

System memory 610 includes any memory device, such as random access memory (RAM), non-volatile (NV) memory, or other memory accessible by devices in system 600. System memory 610 is coupled to controller hub 615 through a memory link 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a PCIe interconnection hierarchy. Examples of controller hub 615 include a chip set, a memory controller hub (MCH), a northbridge, an interconnect controller hub (ICH), a southbridge, and a root controller/hub. Often the term chip set refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through controller hub 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620.

Switch/bridge 620 routes packets/messages from device 625 upstream, i.e., up a hierarchy towards a root complex, to controller hub 615 and downstream, i.e., down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard drive, a storage device, a CD/DVD ROM, a monitor, a printer, a mouse, a keyboard, a router, a portable storage device, a Firewire device, a Universal Serial Bus (USB) device, a scanner, and other input/output devices and which may be coupled via an I3C bus, as an example, and which may enable device transparent grouping of devices to accommodate an expanded address space as described herein. Often in the PCIe vernacular, such a device is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. A graphics controller or the graphics accelerator 630 itself may be integrated in processor 605.

Figure 7:
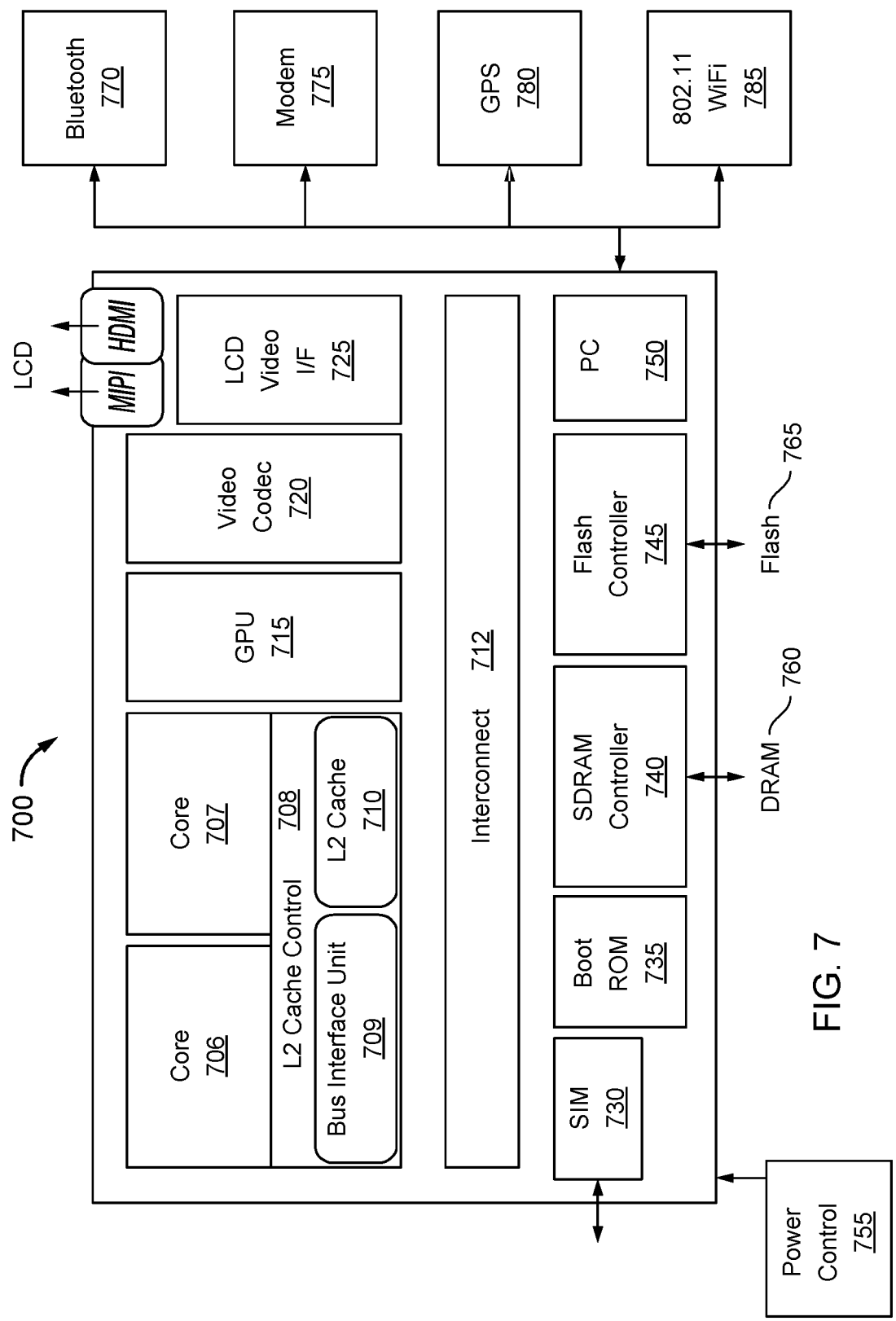
FIG. 7 is a block diagram of an SoC design in accordance with an embodiment of the present invention.

Turning next to FIG. 7, an embodiment of a SoC design in accordance with an embodiment is depicted. As a specific illustrative example, SoC 700 may be configured for insertion in any type of computing device, ranging from portable device to server system. Here, SoC 700 includes 2 cores 706 and 707. Cores 706 and 707 may conform to an instruction set architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 706 and 707 are coupled to cache control 708 that is associated with bus interface unit 709 and L2 cache 710 to communicate with other parts of system 700 system 700 via an interconnect 712.

Interconnect 712 provides communication channels to the other components, such as a Subscriber Identity Module (SIM) 730 to interface with a SIM card, a boot ROM 735 to hold boot code for execution by cores 706 and 707 to initialize and boot SoC 700, a SDRAM controller 740 to interface with external memory (e.g., DRAM 760), a flash controller 745 to interface with non-volatile memory (e.g., flash 765), a peripheral controller 750 (e.g., an eSPI interface) to interface with peripherals, video codecs 720 and video interface 725 to display and receive input (e.g., touch enabled input), GPU 715 to perform graphics related computations, etc. Any of these interconnects/interfaces may incorporate aspects described herein, including the ability to communicate with a given device of multiple device groups using the same address via the device transparent grouping of devices as described herein. In addition, the system illustrates peripherals for communication, such as a Bluetooth module 770, modem 775, GPS 780, and WiFi 785. Also included in the system is a power controller 755.

Figure 8:
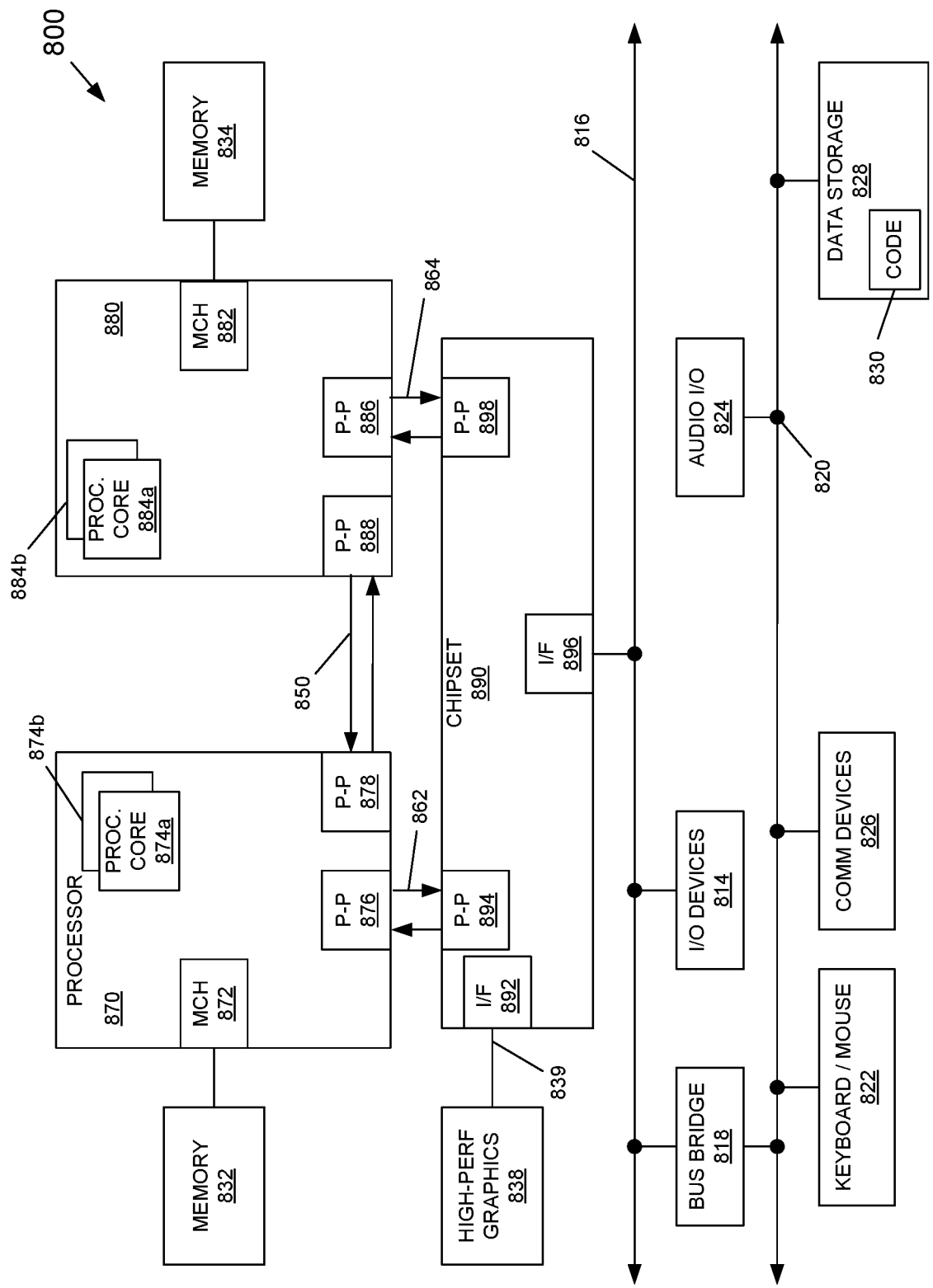
FIG. 8 is a block diagram of a system in accordance with an embodiment of the present invention.

Referring now to FIG. 8, shown is a block diagram of a system in accordance with an embodiment of the present invention. As shown in FIG. 8, multiprocessor system 800 includes a first processor 870 and a second processor 880 coupled via a point-to-point interconnect 850. As shown in FIG. 8, each of processors 870 and 880 may be many core processors including representative first and second processor cores (i.e., processor cores 874a and 874b and processor cores 884a and 884b).

Still referring to FIG. 8, first processor 870 further includes a memory controller hub (MCH) 872 and point-to-point (P-P) interfaces 876 and 878. Similarly, second processor 880 includes a MCH 882 and P-P interfaces 886 and 888. As shown in FIG. 8, MCH's 872 and 882 couple the processors to respective memories, namely a memory 832 and a memory 834, which may be portions of system memory (e.g., DRAM) locally attached to the respective processors. First processor 870 and second processor 880 may be coupled to a chipset 890 via P-P interconnects 862 and 864, respectively. As shown in FIG. 8, chipset 890 includes P-P interfaces 894 and 898.

Furthermore, chipset 890 includes an interface 892 to couple chipset 890 with a high performance graphics engine 838, by a P-P interconnect 839. As shown in FIG. 8, various input/output (I/O) devices 814 may be coupled to first bus 816, along with a bus bridge 818 which couples first bus 816 to a second bus 820. Various devices may be coupled to second bus 820 including, for example, a keyboard/mouse 822, communication devices 826 and a data storage unit 828 such as a disk drive or other mass storage device which may include code 830, in one embodiment. Further, an audio I/O 824 may be coupled to second bus 820. Any of the devices shown in FIG. 8 may be configured to perform communication with device groups to accommodate a greater amount of addressable devices to couple to one or more of the interconnect structures, as described herein. For example an I3C bus may act as a sideband interconnect between processors 870, 880 and memories 832, 834.

The following examples pertain to further embodiments.

In one example, an apparatus comprises a host controller to couple to an interconnect. The host controller may include: a first I/O buffer to couple to a first communication line of the interconnect; a second I/O buffer to couple to a second communication line of the interconnect; and a device group selection circuit to dynamically cause the first communication line to communicate a clock signal to a first device group including one or more first devices to couple to the interconnect and dynamically cause the second communication line to communicate a data signal to the first device group when a communication is to be addressed to at least one of the one or more first devices of the first device group. The device group selection circuit may further optionally dynamically cause the first communication line to communicate a data signal to a second device group including one or more second devices to couple to the interconnect and dynamically cause the second communication line to communicate a clock signal to the second device group when a communication is to be addressed to at least one of the one or more second devices of the second device group.

In an example, the host controller further comprises: a first selection circuit having a first input to receive the clock signal and a second input to receive the data signal, the device group selection circuit to control the first selection circuit to output the clock signal when the communication is to be addressed to the at least one of the one or more first devices; and a second selection circuit having a first input to receive the data signal and a second input to receive the clock signal, the device group selection circuit to control the second selection circuit to output the data signal when the communication is to be addressed to the at least one of the one or more first devices.

In an example, the device group selection circuit is to output a select signal to control the first selection circuit and an inverter is to receive the select signal and output an inverted select signal, where the inverted select signal is to control the second selection circuit.

In an example, the first I/O buffer is coupled to an output of the first selection circuit and the second I/O buffer is coupled to an output of the second selection circuit.

In an example, the one or more first devices include a clock receiver coupled to the first I/O buffer and the one or more second devices include a data receiver coupled to the first I/O buffer.

In an example, the one or more first devices include a data receiver coupled to the second I/O buffer and the one or more second devices include a clock receiver coupled to the second I/O buffer.

In an example, the host controller is to communicate with a first device of the one or more first devices using a first address and communicate with a second device of the one or more second devices using the first address.

In an example, when the communication is to be addressed to the at least one of the one or more first devices of the first device group, the communication is to be transparent to the second device group.

In an example, the host controller is to send a first reset pattern to the first device group and thereafter send a second reset pattern to the second device group.

In another example, a method comprises: receiving, in a host controller coupled to a bus, a first message for a first device of a first device group coupled to the bus; configuring a first driver of the host controller to output a clock signal to the first device group and a second device group coupled to the bus; configuring a second driver of the host controller to output a data signal to the first device group and the second device group; sending the first message, from the host controller, via the second driver, the first message including the data signal addressed to the first device of the first device group, where devices of the first device group are to receive the data signal via data circuitry and devices of the second device group are to receive the data signal via clock circuitry; and sending the clock signal, from the host controller, via the first driver, where devices of the first device group are to receive the clock signal via clock circuitry and devices of the second device group are to receive the clock signal via data circuitry.

In an example, the method further comprises sending the first message including an address of the first device of the first device group.

In an example, the address of the first device of the first device group is also an address of a second device of the second device group.

In an example, the method further comprises sending the first message transparently to the second device group by configuring the first driver of the host controller to output the clock signal and configuring the second driver of the host controller to output the data signal.

In an example, the method further comprises: sending a selection signal to a first selection circuit coupled to the first driver to configure the first driver to output the clock signal; and sending an inverted signal to a second selection circuit coupled to the second driver to configure the second driver to output the data signal.

In an example, the method further comprises, after sending the first message: configuring the first driver of the host controller to output a second data signal to the first device group and the second device group; configuring the second driver of the host controller to output the clock signal to the first device group and the second device group; sending a second message, from the host controller, via the first driver, the second message including the second data signal addressed to a second device of the second device group, where the devices of the first device group are to receive the second data signal via the clock circuitry and the devices of the second device group are to receive the second data signal via the data circuitry; and sending the clock signal, from the host controller, via the second driver, where the devices of the first device group are to receive the clock signal via data circuitry and the devices of the second device group are to receive the clock signal via clock circuitry.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system comprises: a host controller having a first I/O buffer coupled to a first communication line and a second I/O buffer coupled to a second communication line; a first device group including one or more first devices coupled to the host controller, where each of the one or more first devices includes a clock buffer to receive a clock signal via the first communication line and a data buffer to receive a data signal via the second communication line; and a second device group including one or more second devices coupled to the host controller, where each of the one or more second devices includes a data buffer to receive a data signal via the first communication line and a clock buffer to receive a clock signal via the second communication line.

In an example, the host controller is to address $2^N$ devices using N−1 address bits.

In an example, a first device of the one or more first devices and a second device of the one or more second devices are identified with a same address.

In an example, the first device group comprises a first plurality of memory modules each having or more first independently addressable devices and the second device group comprises a second plurality of memory modules each having one or more second independently addressable devices, where one of the first independently addressable devices and one of the second independently addressable devices have a common address.

In an example, the host controller is to: cause the first I/O buffer to output the clock signal and cause the second I/O buffer to output the data signal for a first message, to enable at least one of the one or more first devices of the first device group to receive the first message, the first message transparent to the second device group; and cause the second I/O buffer to output the clock signal and cause the first I/O buffer to output the data signal for a second message, to enable at least one of the one or more second devices of the second device group to receive the second message, the second message transparent to the first device group.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a host controller to couple to an interconnect, the host controller including:
a first input/output (I/O) buffer to couple to a first communication line of the interconnect;
a second I/O buffer to couple to a second communication line of the interconnect; and
a device group selection circuit to:
dynamically cause the first communication line to communicate only a clock signal to a first device group including one or more first devices and dynamically cause the second communication line to communicate only a data signal to the first device group when a communication of a first protocol is addressed to at least one of the one or more first devices of the first device group; and
dynamically cause the first communication line to communicate only a data signal to a second device group including one or more second devices and dynamically cause the second communication line to communicate only a clock signal to the second device group when a communication of the first protocol is addressed to at least one of the one or more second devices of the second device group.

2. The apparatus of claim 1, wherein the host controller further comprises:
a first selection circuit having a first input to receive the clock signal and a second input to receive the data signal, the device group selection circuit to control the first selection circuit to output the clock signal when the communication is to be addressed to the at least one of the one or more first devices; and
a second selection circuit having a first input to receive the data signal and a second input to receive the clock signal, the device group selection circuit to control the second selection circuit to output the data signal when the communication is to be addressed to the at least one of the one or more first devices.

3. The apparatus of claim 2, wherein the device group selection circuit is to output a select signal to control the first selection circuit and further comprising an inverter to receive the select signal and output an inverted select signal, wherein the inverted select signal is to control the second selection circuit.

4. The apparatus of claim 2, wherein the first I/O buffer is coupled to an output of the first selection circuit and the second I/O buffer is coupled to an output of the second selection circuit.

5. The apparatus of claim 1, wherein the one or more first devices include a clock receiver coupled to the first I/O buffer and the one or more second devices include a data receiver coupled to the first I/O buffer.

6. The apparatus of claim 5, wherein the one or more first devices include a data receiver coupled to the second I/O buffer and the one or more second devices include a clock receiver coupled to the second I/O buffer.

7. The apparatus of claim 1, wherein the host controller is to communicate with a first device of the one or more first devices using a first address and communicate with a second device of the one or more second devices using the first address.

8. The apparatus of claim 1, wherein when the communication is to be addressed to the at least one of the one or more first devices of the first device group, the communication is to be transparent to the second device group.

9. The apparatus of claim 1, wherein the host controller is to send a first reset pattern to the first device group and thereafter send a second reset pattern to the second device group.

10. A system comprising:
a host controller having a first input/output (I/O) buffer coupled to a first communication line and a second I/O buffer coupled to a second communication line;
a first device group including one or more first devices coupled to the host controller, wherein each of the one or more first devices includes a clock buffer to receive only a clock signal sent by the host controller on the first communication line and a data buffer to receive only a data signal sent by the host controller on the second communication line; and
a second device group including one or more second devices coupled to the host controller, wherein each of the one or more second devices includes a data buffer to receive only a data signal sent by the host controller on the first communication line and a clock buffer to receive only a clock signal sent by the host controller on the second communication line.

11. The system of claim 10, wherein the host controller is to address $2^N$ devices using N−1 address bits, wherein N is a positive number greater than 2.

12. The system of claim 10, wherein a first device of the one or more first devices and a second device of the one or more second devices are identified with a same address.

13. The system of claim 10, wherein the first device group comprises a first plurality of memory modules having or more first independently addressable devices and the second device group comprises a second plurality of memory modules having one or more second independently addressable devices, wherein one of the first independently addressable devices and one of the second independently addressable devices have a common address.

14. The system of claim 10, wherein the host controller is to:
cause the first I/O buffer to output the clock signal and cause the second I/O buffer to output the data signal for a first message, to enable at least one of the one or more first devices of the first device group to receive the first message, the first message transparent to the second device group; and
cause the second I/O buffer to output the clock signal and cause the first I/O buffer to output the data signal for a second message, to enable at least one of the one or more second devices of the second device group to receive the second message, the second message transparent to the first device group.

15. An apparatus comprising:
at least one core; and
an interface circuit coupled to the at least one core, the interface circuit comprising:
a first input/output (I/O) buffer to couple to a first communication line of a multi-drop bus;
a second I/O buffer to couple to a second communication line of the multi-drop bus; and
a selection circuit to:
dynamically cause the first communication line to communicate only a clock signal to a first device group including one or more first memory devices and dynamically cause the second communication line to communicate only a data signal to the first device group when a communication of a first protocol is addressed to at least one of the one or more first memory devices of the first device group; and
dynamically cause the first communication line to communicate only a data signal to a second device group including one or more second memory devices and dynamically cause the second communication line to communicate only a clock signal to the second device group when a communication of the first protocol is addressed to at least one of the one or more second devices of the second device group, wherein the second device group is coupled in opposition to the first device group.

16. The apparatus of claim 15, wherein the multi-drop bus has an N-bit addressing scheme and greater than $2^N$ of a sum of the first memory devices and the second memory devices are present.

17. The apparatus of claim 16, wherein a first bit of an address of the N-bit addressing scheme is to identify which of the first device group or the second device group the communication is to be directed.

18. The apparatus of claim 16, wherein in response to the communication the host controller is to receive telemetry information from the at least one of the one or more first memory devices of the first device group.

19. The apparatus of claim 15, wherein the first protocol comprises an I3C protocol.

* * * * *